(12) United States Patent
Tollance et al.

(10) Patent No.: US 10,879,780 B2
(45) Date of Patent: Dec. 29, 2020

(54) ELECTROMECHANICAL ACTUATOR FOR CONTROLLING SCREENS AND HOME AUTOMATION EQUIPMENT COMPRISING SUCH AN ACTUATOR

(71) Applicant: SOMFY ACTIVITES SA, Cluses (FR)

(72) Inventors: Thierry Tollance, Pers-Jussy (FR); Sébastien Lemaitre, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 289 days.

(21) Appl. No.: 16/087,930

(22) PCT Filed: Apr. 3, 2017

(86) PCT No.: PCT/EP2017/057822
§ 371 (c)(1),
(2) Date: Sep. 24, 2018

(87) PCT Pub. No.: WO2017/174489
PCT Pub. Date: Oct. 12, 2017

(65) Prior Publication Data
US 2019/0103794 A1    Apr. 4, 2019

(30) Foreign Application Priority Data

Apr. 4, 2016  (FR) .................................... 16 52931

(51) Int. Cl.
*H02K 21/16* (2006.01)
*E06B 9/08* (2006.01)
(Continued)

(52) U.S. Cl.
CPC .............. *H02K 21/16* (2013.01); *E06B 9/08* (2013.01); *E06B 9/68* (2013.01); *H02K 1/146* (2013.01);
(Continued)

(58) Field of Classification Search
CPC .... H02K 21/16; H02K 1/146; H02K 2207/03; H02K 2213/03; E06B 9/08; E06B 9/68; E06B 2009/6845
See application file for complete search history.

(56) References Cited

U.S. PATENT DOCUMENTS 5,045,742 A * 9/1991 Armstrong ............. H02K 1/146
310/216.013
6,441,528 B1 * 8/2002 Uchida ................... H02K 15/03
310/216.001
(Continued)

FOREIGN PATENT DOCUMENTS

CN      102290947 A     12/2011
CN      104011979 A     8/2014
(Continued)

OTHER PUBLICATIONS

International Search Report, dated Jul. 7, 2017, from corresponding PCT/EP2017/057822 application.

*Primary Examiner* — Mohamad A Musleh
(74) *Attorney, Agent, or Firm* — Nixon & Vanderhye (57) ABSTRACT

This electromechanical actuator configured for controlling screens includes an electronically-commutated, brushless, DC electric motor, a rotor and a stator of the electric motor being positioned coaxially around an axis of rotation, the rotor including a rotor body provided with magnetic elements distributed over the outer surface of the rotor, the magnetic elements of the rotor being surrounded by the stator, the stator being formed by a stator core including a circular peripheral wall and pole elements supporting windings, the pole elements being distributed on the inside of the peripheral wall. The ratio between the outer diameter of the stator and the inner diameter of same is less than 1.7.

(Continued)

Further, the ratio between the axial length of the stator and the outer diameter of the stator is greater than 1.5.

19 Claims, 4 Drawing Sheets

(51) Int. Cl.
*E06B 9/68* (2006.01)
*H02K 1/14* (2006.01)

(52) U.S. Cl.
CPC .. *E06B 2009/6845* (2013.01); *H02K 2207/03* (2013.01); *H02K 2213/03* (2013.01)

(56) References Cited

U.S. PATENT DOCUMENTS

| | | | | |
|---|---|---|---|---|
| 7,105,973 | B2* | 9/2006 | Brewster | H02K 21/16 |
| | | | | 310/179 |
| 9,041,269 | B2 | 5/2015 | Kato et al. | |
| 9,837,875 | B2 | 12/2017 | Brondex et al. | |
| 2006/0197402 | A1 | 9/2006 | Gomyo et al. | |
| 2009/0146522 | A1 | 6/2009 | Knoedler et al. | |
| 2011/0309707 | A1 | 12/2011 | Kato et al. | |
| 2017/0334297 | A1* | 11/2017 | Hao | H02K 1/276 |

FOREIGN PATENT DOCUMENTS

| | | | |
|---|---|---|---|
| CN | 104935105 | A | 9/2015 |
| EP | 2 922 183 | A1 | 9/2015 |
| FR | 2 924 664 | A1 | 6/2009 |
| JP | 2006197786 | A | 7/2006 |
| WO | 2014/024973 | A1 | 2/2014 |

* cited by examiner

ELECTROMECHANICAL ACTUATOR FOR CONTROLLING SCREENS AND HOME AUTOMATION EQUIPMENT COMPRISING SUCH AN ACTUATOR

The present invention relates to an electromechanical actuator comprising a motor with a rotor and a motor stator, as well as an automation installation for closing or sun protection comprising such an actuator.

In general, the present invention relates to the field of blackout devices comprising a motor-based driving device setting a screen in motion between at least one first position and one second position.

A motor-based driving device comprises an electromechanical actuator for a movable element for closing, blacking out or providing sun protection such as a blind or a protection screen, or any other equivalent material, hereinafter referred to as a "screen".

The screens equipping buildings have various dimensions, and the choice of materials used has a substantial impact on the mass and inertia of the moving elements and, consequently, the torque necessary to maneuver them. Furthermore, in the case of winding screens intended for indoor use, the winding diameter is a critical characteristic. This diameter must be as small as possible, while making it possible to insert an actuator therein that is said to be "tubular" due to its use inside a winding tube.

The manufacturers of electromechanical actuators allowing the automatic maneuvering of such screens are generally faced with the need to offer electromechanical actuators having torque characteristics sufficient for maneuvering screens with varied dimensions, in a relatively small diameter, in particular in an inner winding tube diameter substantially equal to 40 mm.

The invention therefore in particular relates to the electromechanical actuators used in automation installations more particularly with brushless electric motors with electronic switching. The structure of such motors is as follows: The motor comprises a rotor and a stator positioned coaxially around an axis of rotation. The rotor comprises a rotor body provided with magnetic elements, such as permanent magnets, distributed on the outer surface of the rotor. The magnetic elements of the rotor are surrounded by the stator. The stator is formed by a stator core comprising polar elements supporting windings, the polar elements being distributed on a peripheral wall of the stator. This motor is said to have an internal rotor.

For an application to winding screens, the so-called "tubular" electromechanical actuators generally have a cylindrical elongate casing in which the motor is located, intended to be slipped into a winding tube on which the screen winds. The motors comprised in such electromechanical actuators are therefore designed to have a limited diameter with respect to their length. For other types of screens, such as Venetian blinds or non-winding blinds (pleated, cellular, etc.), the actuators can be cylindrical or have a square or rectangular section, to be inserted into a rail with a corresponding section.

For certain applications such as Venetian blinds, electromechanical actuators with a reduced size are used that are relatively light in weight relative to the provided power. These must provide a torque of approximately from 3 to 10 Nm. Such light motors tend, during operation, to generate significant noise. This noise comes from the fact that the total mass of the actuator is relatively light, such that it tends to vibrate under the effect of the electromagnetic forces to which it is subjected.

Furthermore, a brushless motor like that known from JP-A-2006-197786, which comprises a stator surrounded by a rotor, is not configured to drive a screen and has a large diameter, between 70 and 80 mm, which is difficult to make compatible with its placement in a screen winding tube.

Additionally, an electric servomotor for an assisted steering system, as known from FR-A-2,924,664, has a ratio between the active length of the packet of sheets and the outer diameter of its stator that is comprised between 0.33 and 1. This servomotor is therefore wider than it is long, and therefore unsuitable for being integrated into a screen winding tube.

The present invention aims to resolve the aforementioned drawbacks and to propose an electromechanical actuator making it possible to minimize the noise generated during operation, while remaining cost-effective and providing a torque necessary for the winding of a screen around a winding tube, according to the purpose for which it is provided.

To that end, according to a first aspect, the present invention relates to an electromechanical actuator for controlling screens, comprising an electronically-switched brushless DC electric motor, a rotor and a stator of the electric motor being positioned coaxially around an axis of rotation, the rotor comprising a rotor body provided with magnetic elements distributed over the outer surface of the rotor, the magnetic elements of the rotor being surrounded by the stator, which in turn is formed by a stator core comprising a circular peripheral wall and pole elements supporting windings, the pole elements being distributed on the inside of the peripheral wall. According to the invention, a first ratio R1 between the outer diameter of the stator and its inner diameter is less than 1.7, preferably less than 1.6, still more preferably less than 1.58, while a second ratio R2 between the axial length of the stator and the outer diameter of the stator is greater than 1.5, preferably greater than 2.

Owing to the invention, and in particular owing to the value of the second ratio R2, one obtains an electromechanical actuator whose length greatly exceeds its diameter, which makes it possible to use it within a winding tube of an automation installation. This elongated configuration of the electric motor makes it possible to increase the air gap within the actuator, optionally compensating the power loss by an increase in the axial length of the stator, which makes it possible to reduce the operating noise and improve the robustness of the actuator, by limiting the effects of the air gap variations due to the machining tolerances of the magnets and the method for fastening the magnets on the rotor body and optionally increasing the mass of the electromechanical actuator by increasing the length. The construction defects that lead to these air gap variations are indeed the source of so-called "abnormal" noises. The increase in air gap allows less sensitivity to these variations. Furthermore, the value of the ratio R1 causes the mass of the actuator to be increased relative to a traditional actuator, without a substantial increase in the delivered power. In other words, the invention amounts to decreasing the specific power of the actuator relative to a traditional actuator, the ratio R1 of which would be greater than 1.7, which comes from a nonconventional approach, at a time when there is a tendency to increase the specific power of actuators. In particular, the values of the first and second ratios R1 and R2 make it possible to obtain a specific power of the actuator below 65 watts per kilogram (W/kg).

According to one advantageous aspect of the invention, the stator comprises a total of six pole elements, which makes it a stator with six poles.

Advantageously, the outer diameter of the electric motor of the actuator is smaller than 40 mm, preferably smaller than 36 mm. According to another advantageous aspect of the invention, the magnetic elements are formed by ferrite permanent magnets, the maximum radial thickness of which is greater than 3 mm. The use of ferrite magnets also contributes to obtaining a relatively low power to weight ratio. The ferrite permanent magnets make it possible to provide a relatively high torque, while keeping reasonable production costs. Indeed, ferrite magnets are significantly less expensive than rare metal magnets, such as those made from neodymium, plasto-neodymium or sintered neodymium. Furthermore, ferrite magnets have a lower power to weight ratio than magnets containing rare metals.

These ratios of diameters and lengths distinguish the electric motor according to the invention from so-called "flat" motors, in particular used for fans and not suitable for applications to blinds or shutters for which the electromechanical actuator is inserted into a winding tube of the blind or shutter.

According to another preferred feature of the invention, the permanent magnets are made in the form of tiles and glued on the rotor body, which is cylindrical.

Advantageously, the rotor comprises four or eight permanent magnets in the form of tiles distributed on the periphery of the cylindrical body, while the stator comprises six poles. Furthermore, the magnetic elements are preferably divided into at least two parts over the length of the cylindrical body. The magnets are thus simpler to manufacture.

Owing to one preferred feature of the invention, the magnetic elements are anisotropic magnets formed by a wet pressing method. Thus, the magnets of the rotor are obtained with a preferred magnetization direction. Their performance is greater and the magnets are more stable over time, i.e., they are less susceptible to being demagnetized. Owing to one preferred feature of the invention, these magnetic elements are machined after molding.

In one preferred embodiment, the stator core is formed by a stack of sheets, while the pole elements of the stator core comprise, at the end of a tooth protruding with respect to the peripheral wall of the stator, an enlargement, the width of which is variable along the rotation axis, over the length of the stack of sheets.

According to other advantageous aspects of the invention, this electromechanical actuator may incorporate one or more of the following features, considered in any technically allowable combination:

The peripheral wall of the stator is circular, closed and obtained from a stack of sheets each forming a closed circumference.

The power to weight ratio of the electromechanical actuator is less than 65 watts per kilogram.

The actuator comprises flanges made from an insulating material on which the ends of the windings of the stator are connected.

The actuator comprises metal flanges assembled on either side of the stator body and supporting the rotor using bearings or ball bearings.

According to a second aspect, the invention relates to an automation installation for closing or sun protection comprising a screen able to be wound on a winding tube rotated by an electromechanical actuator as described above.

Other particularities and advantages of the invention will also appear in the description below. In the appended drawings, provided as non-limiting examples.

Figure 1:
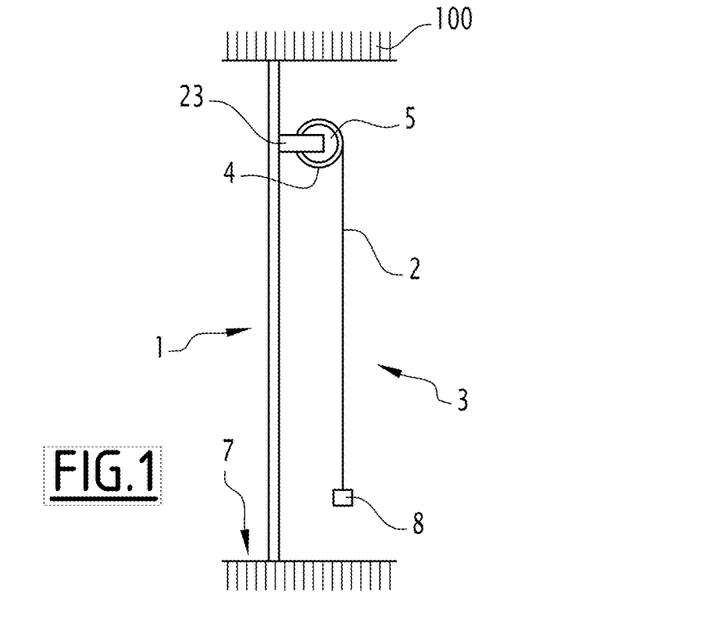
FIG. 1 is a sectional schematic view of a home-automation equipment according to a first embodiment of the invention and comprising a roller blind.
Figure 2:
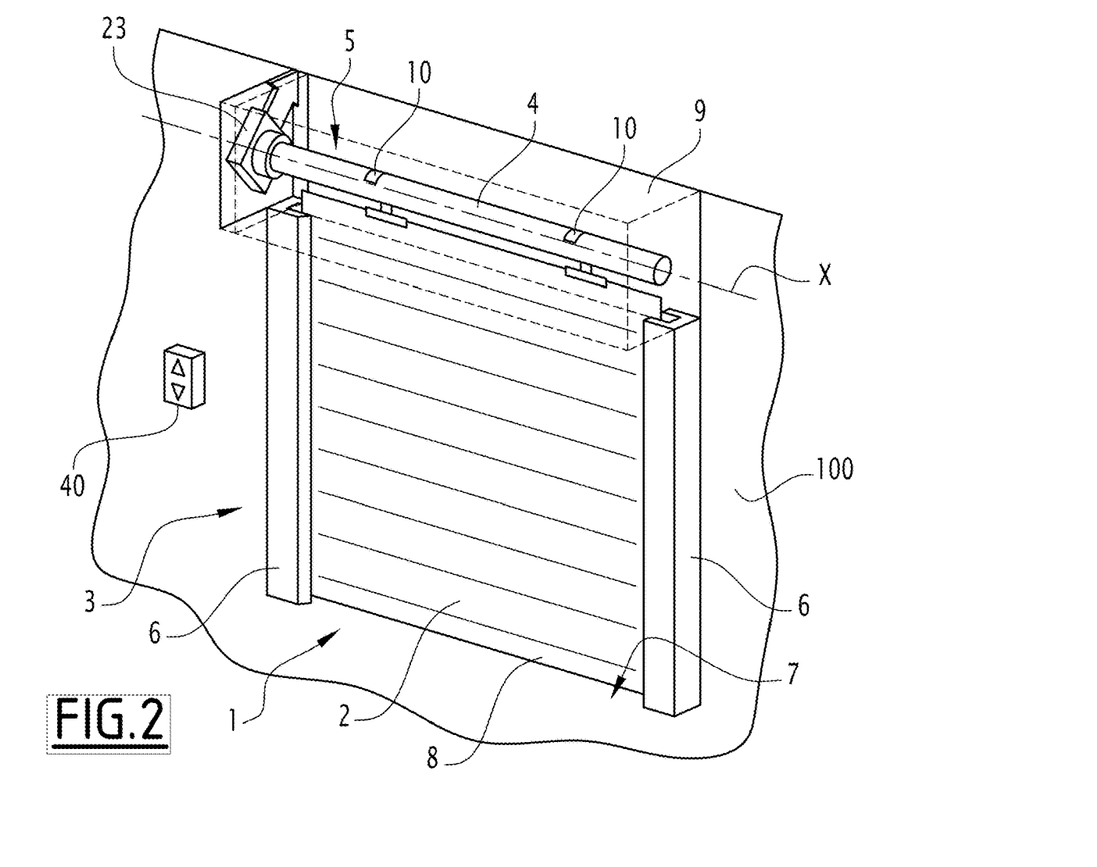
FIG. 2 is a schematic perspective view of an automation installation according to a second embodiment of the invention and comprising a rolling shutter.

In reference to FIGS. 1 and 2, we will first describe two automation installations according to the invention and each installed in a building 100 comprising an opening 1, window or door, equipped with a screen 2 belonging to a blackout device 3, in particular a motor-driven blind or a motor-driven shutter.

The blackout device 3 may be a blind, in particular made from fabric, that is able to be wound, as shown in FIG. 1, a creased or slatted blind, or a shutter, as shown in FIG. 2.

A roller blind and a shutter according to embodiments of the invention will be described in reference to FIGS. 1 and 2, respectively.

In the first embodiment illustrated in FIG. 1, the screen 2 of the blackout device 3 is wound on a winding tube 4 driven by a motor-based driving device 5 and movable between a wound position, in particular an upper position, and an unwound position, in particular a lower position. The blackout device 3 comprises a support 23 of the screen 2, as well as the winding tube 4 for winding the screen 2.

In a known manner, the roller blind of the blackout device 3 includes a fabric, forming the screen 2 of the roller blind 3. A first end of the screen 2, in the case at hand the upper end of the screen 2 in the assembled configuration of the blackout device 3 in the home-automation equipment, is fastened to the winding tube 4. Additionally, a second end of the screen 2, in the case at hand the lower end of the screen 2 in the assembled configuration of the blackout device 3 in the home-automation equipment, is fastened to a load bar 8, the weight of which exerts tension on the screen 2. In FIG. 1, the fabric forming the screen 2 is made from a textile material.

In a known manner, the first end of the screen 2 is fastened to the winding tube 4, in particular over the entire length of the winding tube 4, so as to be able to wind and unwind the screen 2 around the winding tube 4.

In the case of a roller blind, the high wound position corresponds to a predetermined high end-of-travel position, or to the contact of the load bar 8 of the screen 2 against the support 23 of the screen 2 of the roller blind 3, and the low unwound position corresponds to a predetermined low end-of-travel position, or to the contact of the load bar 8 of the screen 2 against a threshold 7 of the opening 1, or to complete unwinding of the screen 2. The installation shown in FIG. 1 does not include a housing and the fabric forming the screen 2, wound on the winding tube 4, is visible.

In the second embodiment illustrated in FIG. 2, the screen 2 belongs to a rolling shutter 3 that comprises an apron comprising horizontal slats articulated on one another, forming the screen 2 of the rolling shutter 3, and guided by two lateral guideways 6. These slats are joined when the screen 2 reaches its unwound lower position. The upper slat of the screen 2 is attached to the winding tube 4 by two fasteners 10.

In this case, the wound upper position corresponds to the contact of a final L-shaped end slat 8 of the apron 2 of the rolling shutter 3 against an edge of a housing 9 of the rolling shutter 3, while the unwound lower position corresponds to the contact of the final end slat 8 of the apron 2 of the rolling shutter 3 against a threshold 7 of the opening 1.

The winding tube 4 is positioned inside the housing 9 of the rolling shutter 3. The apron 2 winds and unwinds around the winding tube 4 and is housed at least partially inside the housing 9. In general, the housing 9 is positioned above the opening 1, or in the upper part of the opening 1. The housing 9 is an integral part of the support device of the screen 2.

The motor-based driving device 5 is controlled by a control unit 40. The control unit 40 may for example be a local control unit, as shown in FIG. 2, or a central control unit, not shown. The central control unit optionally drives the local control unit, as well as other similar local control units distributed throughout the building 100.

The central control unit can be in communication with a weather station, inside or outside the building 100, in particular including one or more sensors that can be configured for example to determine a temperature, brightness, or wind speed in the case of an outside weather station.

A comparable control unit, not shown, is used in the first embodiment.

In FIG. 2, only one screen support 23 is shown. In practice, the installation preferably comprises a screen support 23 at each end of the winding tube 4.

The motor-based driving device 5 is preferably configured to carry out the unwinding or winding commands of the screen 2 of the blackout device 3, which may in particular be acquired by a local or central control unit.

Figure 3:
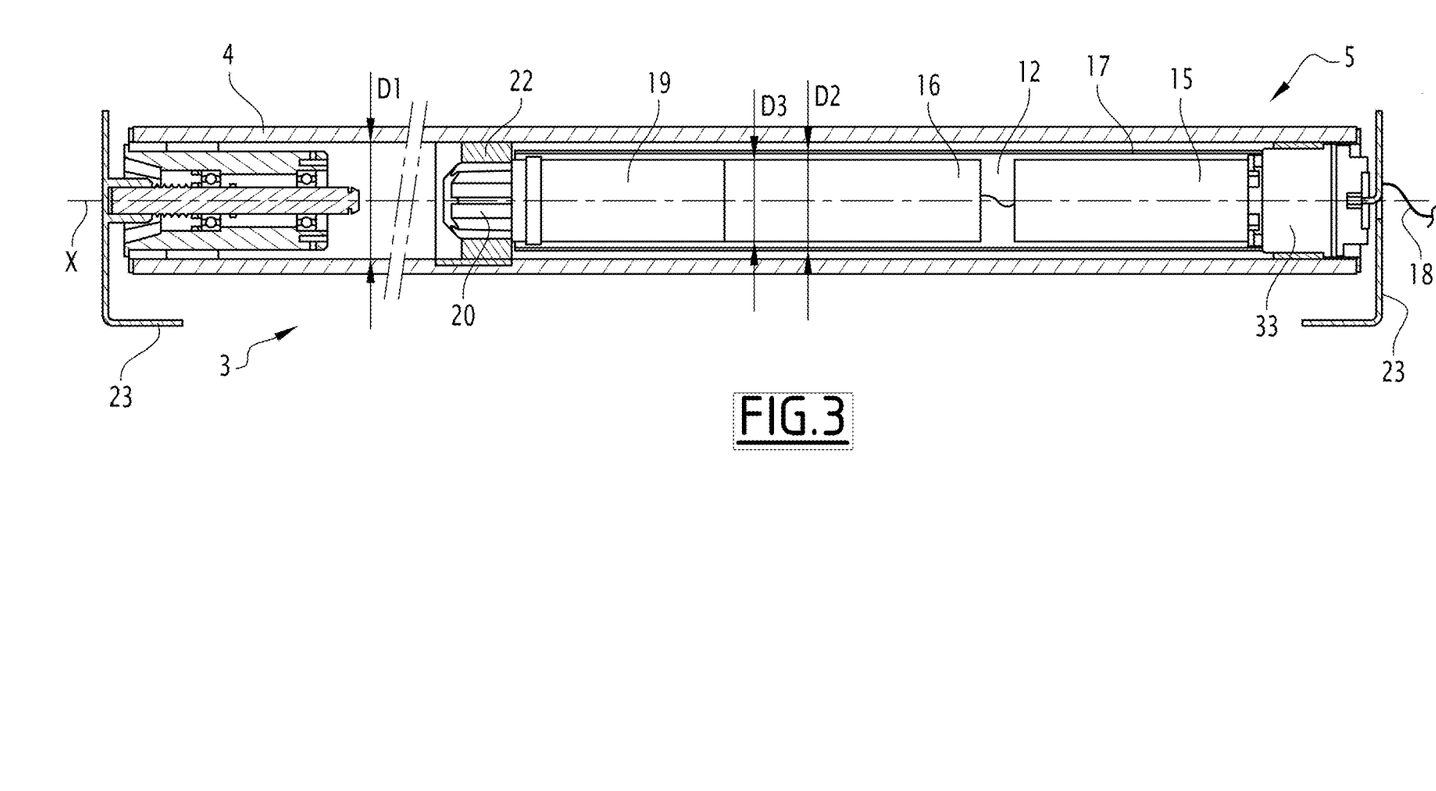
FIG. 3 is a longitudinal schematic sectional view of a winding tube belonging to one of the installations of FIGS. 1 and 2 and comprising an electromechanical actuator according to one embodiment of the invention.

FIG. 3 is a cross-sectional view of a motor-based driving device 5 that can be either that of the installation of FIG. 1, or that of the installation of FIG. 2. This motor-based driving device 5 comprises an electromechanical actuator 12, of the tubular type, configured to set the winding tube 4 in rotation so as to unwind or wind the screen 2 of the blackout device 3. In the mounted state, the electromechanical actuator 12 is inserted into the winding tube 4. To that end, the inner diameter D1 of the winding screen 4 is substantially larger than the outer diameter D2 of the electromechanical actuator 12, such that the electromechanical actuator 12 can be inserted into the winding tube 4 during the assembly of the blackout device 3. According to another embodiment, the electromechanical actuator incorporates a cylindrical electric motor, but its casing has a square or rectangular section and the latter is inserted in a rail with a similar section, open on one side. The actuator then drives a drive shaft on which cords for deploying the screen are wound.

The electromechanical actuator 12 comprises an electric motor 16. The electric motor 16 comprises a rotor 13 and a stator 14, shown schematically in FIGS. 4 and 5 and positioned coaxially around a rotation axis X, which is also the rotation axis of the winding tube 4 or the drive shaft in the assembled configuration of the motor-based driving device 5. Reference D3 denotes the outer diameter of the electric motor 16, this diameter in practice being equal to the outer diameter of the stator 14. Hereinafter, only the embodiment of a tubular electromechanical actuator will be described, but the teachings apply by analogy to the casing of an electromechanical actuator of a screen, the casing of which is non-cylindrical.

Control means for controlling the electromechanical actuator 12, making it possible to move the screen 2 of the blackout device 3, comprise at least one electronic control unit 15. This electronic control unit 15 is able to operate the electric motor 16 of the electromechanical actuator 12, and in particular to allow the supply of electricity for the electric motor 16.

Thus, the electronic control unit 15 in particular controls the electric motor 16, so as to open or close the screen 2, as previously described.

The electronic control unit 15 in particular comprises a command receiving module, not shown, for commands, the commands being sent by a command transmitter, such as the remote control 40. Preferably, the command receiving module of the electronic control unit 15 is of the wireless type. In particular, this module 47 is configured to receive wireless commands. The command receiving module can also allow the reception of commands sent by wired means.

The control means of the electromechanical actuator 12 comprise hardware and/or software means. As one non-limiting example, the hardware means may comprise at least one microcontroller.

Here, the electromechanical actuator 12 comprises an electrical energy supply cable 18 making it possible to supply electricity from the reader or from a battery (not shown). The casing 17 of the electromechanical actuator 12 is preferably cylindrical. In one embodiment, the casing 17 is made from a metallic material. The material of the casing 17 of the electromechanical actuator 12 is in no way limiting. It may be different. The casing may in particular be made from plastic.

The electromechanical actuator 12 also comprises a reducing gear device 19 and an output shaft 20. The electromechanical actuator 12 may also comprise an end-of-travel and/or obstacle detection device, which may be mechanical or electronic. Advantageously, the electric motor 16 and the reducing gear device 19 are positioned inside the casing 17. The diameter D3 of the electric motor is smaller than the diameter D2 of the actuator (equal to the outer diameter of the casing 17), to be inserted into the casing 17 of the latter, the diameter D2 of the electromechanical actuator 12 being smaller than the diameter D1 of the winding tube 4 in which the electromechanical actuator 12 must be inserted. In practice, in order for the actuator 12 to be able to be housed in a winding tube 4 whose diameter D1 is 40 mm, the diameter D3 is less than 40 mm, preferably less than 36 mm. The output shaft 20 of the electromechanical actuator 12 is positioned inside the winding tube 4, and at least partially outside the casing 17.

The output shaft 20 of the electromechanical actuator 12 is coupled by a connecting means 22 to the winding tube 4, in particular using a wheel-shaped connecting means 22.

Here, the casing 17 of the electrochemical actuator 12 is fastened to the support 23, in particular to a support tab fastened on the one hand on a stationary structure and on the other hand on a head 33 of the electromechanical actuator 12.

Here and as illustrated in FIG. 3, the electronic control unit 15 is positioned inside the casing 17 of the electromechanical actuator 12. Thus, the electronic control unit 15 is incorporated inside a casing 17 of the electromechanical actuator 12.

In another embodiment, the electronic control unit 15 is positioned at least partially outside the casing 17 of the electromechanical actuator 12, and in particular, mounted on the support 23 or in the housing 9.

Figure 4:
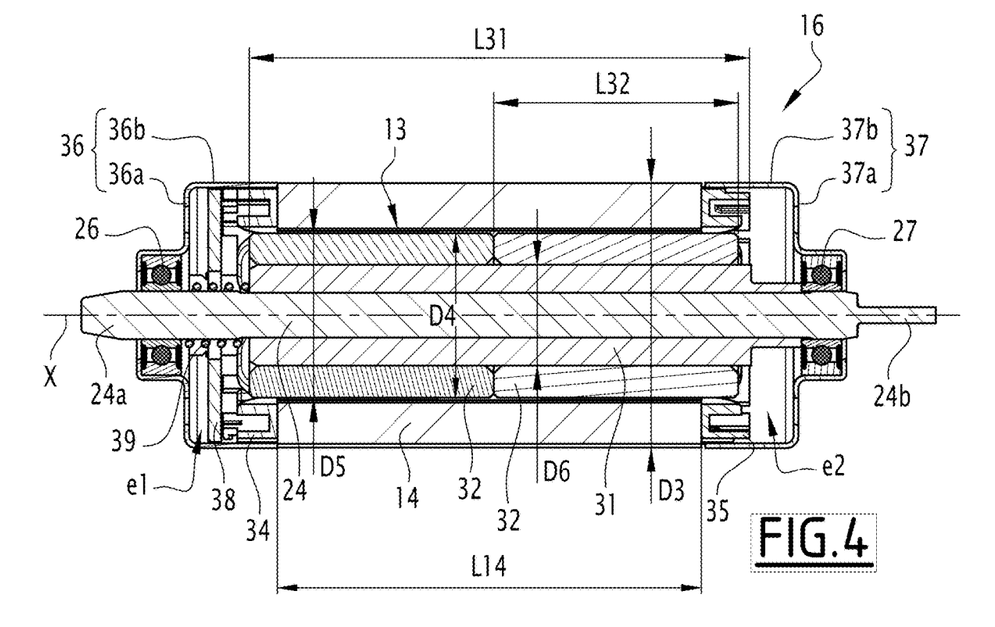
FIG. 4 is a longitudinal sectional view of an electric motor of the electromechanical actuator of FIG. 3, this electric motor being of the electronic-switching brushless DC type.

The electric motor 16 of the electromechanical actuator 12 will now be described in more detail and in reference to FIGS. 4 and 5.

The electric motor 16 of the electromechanical actuator 12 is of the electronic-switching brushless direct-current (BLDC) type.

The rotor 13 comprises a rotor body 31 provided with magnetic elements 32 surrounded by the stator 14. The magnetic elements 32 are positioned on the outer circumference of the rotor body 31. The magnetic elements 32 of the rotor 13 are ferrite permanent magnets.

The magnetic elements 32 are separated from the stator 14 by an air gap 25, which is radial relative to the rotation axis X.

Reference e32 denotes the radial thickness of the magnetic elements 32, which is measured in a direction radial to the axis X. This thickness e32 is chosen to be greater than 3 mm, preferably between 3.8 and 4.2 mm, which contributes to providing the electromagnetic forces necessary for the operation of the motor, participates in the industrial feasibility of the permanent magnets and limits the risks of the magnetization thereof.

The magnetic elements or permanent magnets 32 can be attached on the outer circumference of the rotor body 13 by adhesion, overmolding or any other known technique.

References D5 and D6 respectively denote the outer diameter of the rotor 13 and the outer diameter of the body of the rotor 31. The diameter D5 is greater than or equal to half the diameter D3.

The rotor body 31 is secured in rotation with a rotor shaft 24. The rotor shaft 24 is centered on the rotation axis X and protrudes on either side of the rotor body 31. Thus, the rotor shaft 24 comprises first and second ends 24a, 24b protruding relative to the rotor body 31. Advantageously, the rotor body 31 is formed from a stack of sheets.

In another embodiment, the rotor body 31 is formed by a massive shaft. In another embodiment corresponding to the casing of a hollow rotor, the rotor body 31 is formed by a stamped bell.

Reference L31 denotes the axial length of the rotor body 31, which is measured parallel to the axis X. The axial length L31 is at least equal to 1.5 times the outer diameter D5 of the rotor 31, preferably at least equal to 2, or even 3 times the diameter D5, which contributes to the tubular shape of the actuator able to be inserted into a winding tube. This axial length can be greater than the axial length L14 of the stator 14, which is also measured parallel to the axis X. In practice, the axial lengths L14 and L31 have relatively close values, in that the ratio L14/L31 is comprised between 0.8 and 1.2, preferably between 0.9 and 1.1.

The ends 24a, 24b of the rotor body 31 are kept aligned with metal flanges 36, 37 by bearings or ball bearings 26, 27. Advantageously, a spiral spring 39 stresses the axial positioning of the rotor body 31 between the two flanges 36, 37.

The magnetic elements 32 are magnets in tile form. These tiles must be distributed regularly on the outer surface of the rotor body 31. An irregularity in the positioning of the tiles could lead to noise generation. These tiles are not adjacent. Their shape must therefore respect certain constraints, to prevent them from touching.

Reference L32 denotes the axial length of a magnetic element 32, which is measured parallel to the axis X. Reference l32 also denotes the width of a magnetic element 32 that is measured in a circumferential direction relative to the axis X, at mid-distance between the inner and outer radial surfaces of this element. Thus, considering that the thickness e32 is comprised between 3.8 and 4.2 mm as considered above, the width l32 can be comprised between 12 mm and 12.6 mm, while the length L32 is comprised between 20 mm and 40 mm, preferably between 24 and 34 mm. This gives the magnets 32 a shape compatible with most rotor 13 geometries. These value ranges make it possible to guarantee the industrial feasibility of the magnets. The radial thickness of the magnets cannot be constant, the maximum thickness then being situated in the center of the section of a magnet, considered transversely to the rotation axis of the electric motor.

In one preferred example, the ratio e32/L32, for length values L32 between 24 and 34 mm, is comprised between 3.8/34≈0.11 and 4.2/24=0.175 in the example. In practice, this ratio is chosen to be less than 0.2, preferably less than or equal to 0.18. In the preferred embodiment, four magnets are chosen each forming a magnetic element 32 and distributed around the rotor body 31, thus forming a rotor 13 with four poles.

It would technically be possible to use only two magnets distributed around the rotor body 31, thus forming a rotor 13 with two poles, but in this case it would be necessary to adapt the stator 14 with six poles. The performance for a pole ratio 2/6 for the rotor 13 and the stator 14 is not as good as for a 4/6 ratio. Furthermore, using only two magnets would require obtaining magnets with a more curved section or reducing their width, i.e., the coverage by the magnets on the perimeter of the rotor 13.

Conversely, it is advantageous to use, with the same rotor 14, eight magnets 32 distributed around the body 31.

Currently, for a magnet with a radial thickness e32 comprised between 3 and 4 mm, the maximum available length is 40 mm. The maximum needed length is 61.1 mm for an electric motor 16 intended to be used with a winding tube 4 having an inner diameter D1 equal to 40 mm. It is possible to meet this length need by associating several magnets one after the other, in particular two magnets, over the length of the body of the rotor 31 in order to form a magnetic element 32, as visible in FIG. 4. In this case, the magnetic elements 32 are divided into at least two parts over the length L31 of the body 31.

In another embodiment, the magnetic elements 32 are made in the form of a ring made from polarized ferrite. At this time, such a ring offers performance levels substantially equivalent to tile magnets, with a comparable thickness. It is, however, more difficult to manufacture in the required lengths for this application, namely around 60 mm. However, it remains possible to assemble several rings one after the other, while being careful to index the polarized sectors.

The polarization of the ring can be a polarization with 2, 4, 6 or 8 poles. Preferably, the polarized ring can have a thickness greater than that of the tile magnets, while reducing the diameter D6 of the rotor body 31. The magnet itself is then more expensive, but this simplifies the production and cost of the rotor body 31. Furthermore, the gain in magnet volume makes it possible, in this case, to maximize the performance levels of the electric motor 16.

At this time, the solution with several tile magnets 32 distributed on the periphery of the body of the rotor 31 is, however, preferred, since it makes it possible to obtain remanent field values Br within the motor 16 that are superior to the values associated with magnets in the form of a radially polarized ring. This remanent field Br is about 0.43 Tesla, or even about 0.45 Tesla for tile-forming magnets, which is well suited to the desired values for an application in the case of an actuator 12 for a blackout device 3. Currently, ferrite magnetic rings only make it possible to achieve remanent field values Br below 0.42, which is not optimal. This can change, which would make this second solution more attractive.

The minimum value of the diameter D5, which can be obtained, is determined by the technology and the geometry of the magnets 32 attached on the rotor body 31. The width 132 of the magnets 32, measured in a direction orthoradial to the axis X, dimensions the minimum value of the diameter D5. If the diameter D6 of the body of the rotor 31 is reduced, it is necessary to reduce the maximum width of the tile magnets 32 to prevent the magnets from touching or the polarized sectors from having an excessively triangular shape, in the case of a polarized ring rotor. Furthermore, the volume of each magnet 32 contributes to the performance of the actuator 12. A magnet with a trapezoidal section is not of interest in terms of performance, and it induces a greater risk of demagnetization at its thinnest parts.

In terms of performance and to limit the risks of demagnetization, for the magnets, a substantial volume, in particular a substantially rectangular section, in other words with a substantially constant width over the thickness of the magnet, is the best solution. Thus, advantageously, since it is necessary to maximize the outer diameter D5 of the rotor 13 to address these constraints, it is possible to reuse at least certain parts of a rotor 13 suitable for electric motors 16 having a larger diameter D3, for example electric motors 16 suitable for being inserted into winding tubes 4 whose inner diameter D1 is 50 mm, or comprised between 42 and 50 mm.

Figure 7:
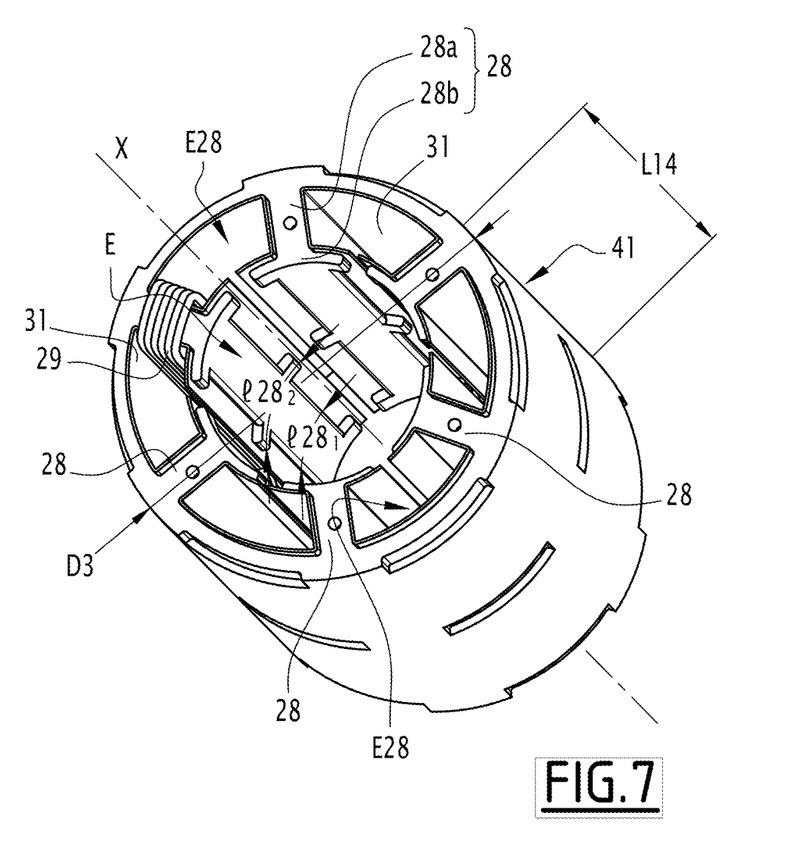
FIG. 7 is a schematic perspective view of the stator of the electric motor of FIGS. 4 and 5.

The stator 14 is formed by a stator core 41 made from a magnetizable material, more specifically a ferromagnetic material, which is generally formed by a stack, or packet, of sheets and provided with insulating liners. The stator core 41 comprises pole elements 28 distributed on a peripheral wall 30 of the stator core 41, in practice over the inside of the peripheral wall 30 of the stator core 41, i.e., on the side of the peripheral wall 30 oriented toward the axis X. The stator 14 is obtained from a stator core 41 comprising a stack of sheets each forming a closed circumference, on which a winding assembly is attached, and not by a set of wound sectors, with one or several teeth, which, by their assembly, form the closed circumference of the stator core 41. The small dimensions of the electric motor 16 do not make it possible to produce the stator 14 by assembling several wound angular sectors.

Figure 5:
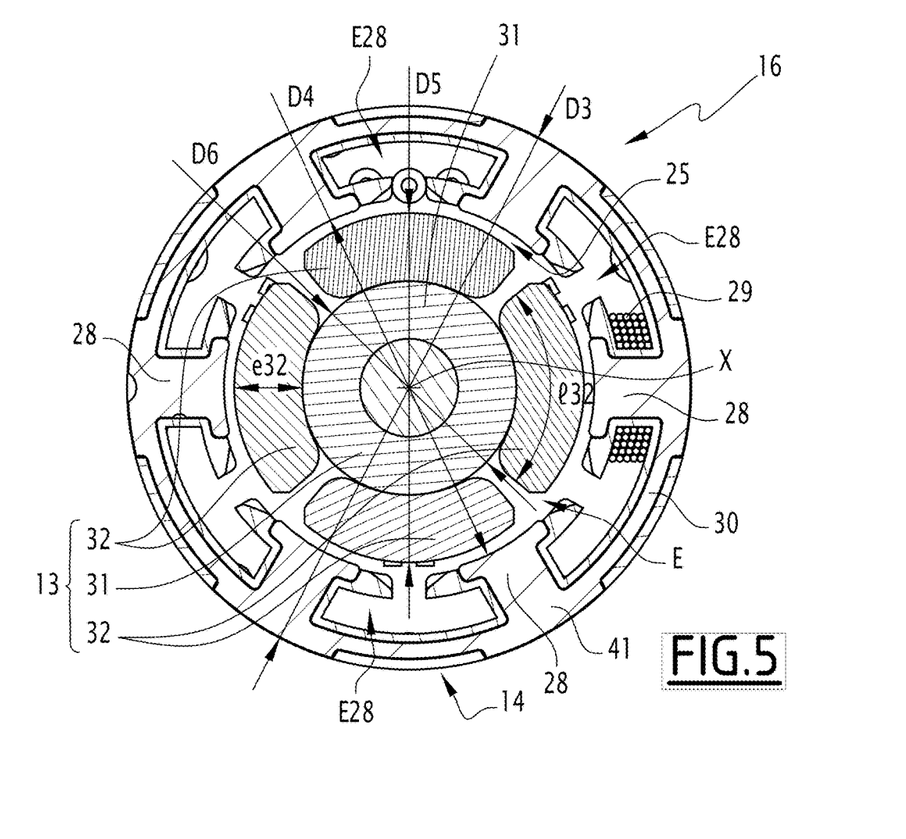
FIG. 5 is a cross-section of the electric motor of FIG. 4.

In FIGS. 5 and 7, a single winding 29 is shown in place around a single pole element 28, for the clarity of the drawing.

The pole elements 28 of the core 41 protrude toward the inside of the electric motor 16, from the peripheral wall 30. Advantageously, there are six of them, uniformly distributed over the peripheral wall 30, thus forming a stator 14 with six poles. A notch refers to the space E28 formed between two adjacent pole elements 28. Windings 29 are positioned in the notches, around the pole elements 28 of the stator 14. More specifically, each pole element 28 is surrounded by a winding 29 specific to it. These windings 29 are such that they have the same number of turns per pole element. The windings 29 of the diametrically opposite pole elements are connected at the ends of the stator core 14 to form a phase. The six windings 29 being connected in pairs, the stator 14 therefore comprises three phases, in particular forming a star configuration. The windings 29 are connected such that when a current travels through them, they produce a rotating magnetic field that rotates the rotor 13. The windings 29 are electrically insulated from the stator core 41 by an insulating element. This insulating element is a sheet of "paper" made from Nomex or Mylar (registered trademarks), which is also used for the same purpose on the asynchronous motors, in particular on versions of electric motors whose operating voltage is close to 230 V. This insulating element is visible only in FIG. 7, in each space E28, with reference 31. Insulation is not necessarily used on extra low voltage motor versions, called ELV, the supply voltage of which is close to 12 V.

Advantageously, the pole elements 28 of the stator core 41 comprise, at the end of a tooth 28a protruding with respect to the peripheral wall 30 of the stator 14, an enlargement 28b, the width of which is variable, along the rotation axis X, in the stack of sheets forming the stator core 41.

The enlargements or isthmuses 28b with a first width $128_1$, called "short", are favorable to a reduction in magnetic forces in the electric motor 16, and therefore, by extension, to a possible reduction in the noise produced by the electric motor 16.

The enlargements or isthmuses 28b with a second width $128_2$ greater than the first width, called "long", in turn make it possible to obtain a maximum winding space through the creation of a maximum notch surface and are therefore favorable to optimizing the filling of the adjacent notch E28 with the copper of a winding 29.

By carefully distributing, over the length of the stator 14, the pole elements 28 having short and long enlargements, one optimizes both the reduction of the magnetic forces and therefore the generated noise, and the power produced by the motor.

In particular, the presence of fewer long enlargements than short enlargements over the length of the stator 14 makes it possible to limit the noise generated by the electric motor 16. The regular or irregular distribution of the long enlargements intercalated with the short enlargements makes it possible to keep the insulating elements 31 in their respective notches E28. The maintenance of the turns of a winding 29 in a notch is then done in part by the insulating element 31 placed in the notch and forming the notch surface. The long enlargements 28b make it possible to stiffen the insulating element at the opening of each notch, between two pole elements, and thus to maintain the turns of the winding 29.

The stack of sheets is preferably made up of pole elements with short enlargements, except in the zones with strong mechanical stresses of the wires of the windings 29, i.e., at each end and in the middle of the stack, where the pole elements have long enlargements, as illustrated in FIG. 7. According to one example embodiment, the stack of sheets comprises one or two long enlargements 28b at each end of the packet of sheets as well as one or two long enlargements 28b in the middle of the packet of sheets. The other enlargements are short.

In the case at hand, the part forming the peripheral wall 30 of the stator core 41 forms the cylinder frame of the stator at the same time. No loopback part for the flow needs to be attached after the winding.

The part forming the stator 14 is a part formed by sheet plates substantially forming a complete circle, as illustrated in FIG. 7. This configuration requires making the windings 29 using a so-called "needling" method.

According to this method, an insulating conductive wire, for example an enameled copper wire, which unwinds from a reserve, for example a spool, is successively wound around each pole element 28 of the stator 14, using a needle support.

The needle support comprises a shuttle or winding head, mounted at the end of a hollow horizontal shaft, driven in a to-and-fro movement along a rotation axis X of the rotor 13. Inside this winding head, one or several winding needles can slide, the number of needles corresponding to the number of windings 29 to be wound at the same time. Each of these needles is tubular and includes an axial channel through which the insulated wire to be wound passes. Each needle includes a curved part having an appropriate curve radius, which cooperates with a straight part.

The needle support performs, in the direction of the rotation axis X of the electric motor 16, a to-and-fro movement through the inner bore of the sheet packet of the stator 14. In its two breakeven point positions, it turns in one direction or the other by a quantity that corresponds to the width of the winding 29 to be done, during which operation the insulated wire of the winding 29 is guided from one side to the other of the pole element 28 on which the winding 29 must be made. The insulated wire is pulled each time, during the movement of the needle support to the width of the winding 29, in order to form the involute of the winding 29, above the pole element 28, and being placed in the notch E28 provided to receive it between the pole element 28 on which it is wound and an adjacent pole element 28. The movement of the needle support is therefore a combination between an alternating rotating movement and an axial translation movement.

The insulated wire of the winding 29 therefore substantially precisely follows the path that the winding needle performs in its movement along the sides and above the pole element to be wound, and the different parts of the insulated wire of the winding 29 that form the winding 29 on either side of the pole element 28 become placed in the aforementioned space, intended to receive it, so as to be parallel to one another.

Furthermore, flanges 34, 35 made from an insulating material are attached to both ends of the stator 14. These in particular make it possible to keep the windings 29 in place, provide the connector technology of the ends of the wound wires and insulate the ends of the stator 14. Alternatively, the connector technology of the ends of the wound wires is made directly on a printed circuit board, not shown, of the electromechanical actuator 12. On top of these insulating flanges 34, 35, the metal flanges 36, 37 are attached, in bell form, which are assembled by adhesion or welding on the sheets forming the stator core 41. The metal flanges 36, 37 comprise a bottom wall 36a, 37a as well as a side wall 36b, 37b in the continuation of the peripheral wall 30 of the stator core 41, this peripheral wall 30 having a circular section and having a cylindrical shape. They are made from a stamped sheet. These metal flanges 36 and 37 make it possible to maintain the ball bearings or bearings 26, 27 supporting the rotor 13 and increase the rigidity of the electric motor assembly 16. These flanges 36 and 37 can also be made from plastic. However, manufacturing the flanges 36 and 37 from metal gives them a stiffness and a mass greater than when they are made from plastic and guarantees good geometric precision.

The stator 14 defines a cylindrical inner space E with a circular section in which the rotor 13, including the magnetic elements 32, is positioned and inside which the rotor 13 rotates when the motor 16 is running. The diameter D4 is therefore the inner diameter of the stator 14. The diameter D4 of the cylindrical inner space E is such that this cylindrical inner space E receives the rotor 13 as well as the magnetic elements 32, with an air gap having a non-nil radial thickness between these magnetic elements 32 and the pole elements 28. The magnetic or magnetized part of the rotor 13 being located inside the cylindrical space E in the stator 14, the rotor 13 is described as inner rotor. It is recalled here that D3 corresponds to the outer diameter of the stator 14.

Reference R1 denotes the ratio between the diameters D3 and D4. This therefore yields the relationship:

$$R1 = D3/D4 \quad \text{(equation 1)}$$

By construction, the ratio R1 is strictly greater than 1, since the diameter D3 is necessarily larger than the diameter D4. The value of the ratio R1 is chosen to be less than 1.7, which means that the inner cylindrical space E of the stator 14 occupies a relatively large volume, compared with the total volume of the motor 16. This leaves relatively little space to position the pole elements 28 and the windings 29. The windings 29 therefore have a relatively limited number of turns, which requires increasing the length of the motor 16, therefore its mass to provide the necessary power for the operation of the actuator to deploy and fold a screen, such as a blind or shutter. Consequently, the power to weight ratio of the motor 16, therefore of the actuators 12, is decreased relative to a case where the ratio R1 is greater than 1.7.

Preferably, this ratio R1 is chosen to be less than 1.6, or even less than 1.58, which makes it possible to further increase the effect mentioned above, while remaining within feasibility and torque limits to be provided for applications to the screens of an automation installation.

Additionally, R2 denotes the ratio of the axial length L14 of the stator 14 to the outer diameter D3 of the stator 14. This therefore yields the relationship:

$$R2 = L14/D3 \quad \text{(equation 2)}$$

The value of the ratio R2 is chosen to be greater than 1.5, preferably greater than 2, still more preferably greater than 3, which means that the motor 16, therefore the actuator 12, are substantially longer than they are wide. This is suitable for an installation within a winding tube, like the tube 4. The value of this ratio R2 makes it possible to obtain a total length of the windings 29 suitable for generating a sufficient torque to drive a winding tube 4, despite the relatively low value of the ratio R1, while guaranteeing the industrial feasibility of the winding of the stator 14.

On either side of the cylindrical space E, the first bearing 26 and the second bearing 27 provide rotational support for the rotor shaft 24. Thus, the rotor shaft 24 is rotatably mounted at both of its ends 24a and 24b by means of the two bearings 26, 27.

Here, the first end 24a of the rotor shaft 24 is in contact with the first bearing 26, while the second end 24b of the rotor shaft 24 is in contact with the second bearing 27. The first and second bearings 26, 27 are thus positioned on either side of the rotor body 31 along the axis of rotation X. The first bearing 26 or the second bearing 27 can assume the form of a ball bearing or a bearing bushing.

In another embodiment, the electric motor 16 comprises a single bearing supporting the rotor shaft 24.

The first and second bearings 26, 27 are housed in a recess of the bottom wall 36a, 37a of the metal flanges 36, 37 of the electric motor 16.

Advantageously, the two insulating flanges 34, 35 are identical. Likewise, the two metal flanges 36, 37 are identical. Between an insulating flange 34, 35 and a metal flange 36, 37, lateral spaces e1 and e2 are arranged. In other words, a lateral space is arranged between the end of the windings 29, i.e., the axial end of the stator 14, and the bottom wall 36a, 37a of each metal flange 36, 37.

Figure 6:
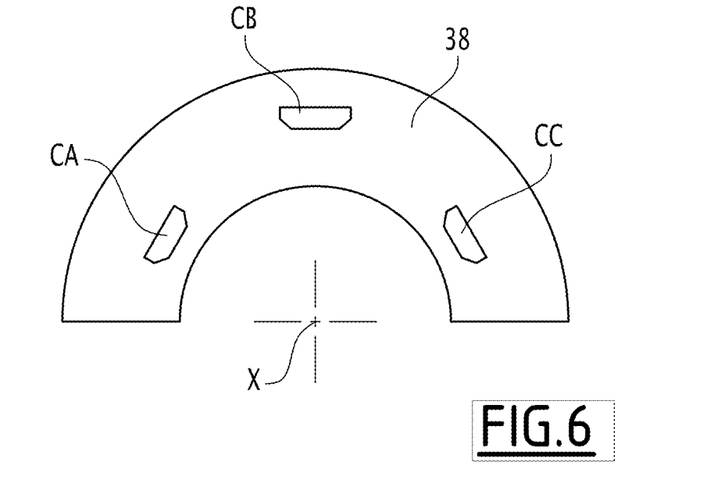
FIG. 6 is a schematic view of a printed circuit supporting sensors and used in the motor of FIGS. 4 and 5.

In one of these lateral spaces e1 or e2 is housed a printed circuit board 38 and/or the spiral spring 39 for stressing the rotor 13 with respect to the stator 14. The printed circuit board 38 is part of the electronic unit 15 of the electric motor 16.

In particular, the printed circuit board 38 of the electronic control unit 15 comprises sensors CA, CB, CC, for example Hall effect sensors, which make it possible to identify the passage of the magnetic elements 32 during the rotation of the rotor 13. These sensors are placed so as to obtain a predefined phase shift between the electromotive force or "fem" of the motor and the sensors, at 0° or 30°, for example. This information is processed by an electronic processing unit, not shown, in order to determine the angular position of the rotor 13 relative to the windings 29. These sensors CA, CB, CC are positioned near the axial end of the stator 14, in order to detect the flow variations caused by the passage of the magnets 32 of the rotor 13.

Due to the diameter constraint D3 of the electric motor 16 and the elements making it up, namely the rotor 13, its body 31 and its magnetic elements 32 and the stator 14, the sensors CA, CB, CC cannot be positioned radially relative to the magnetic elements 32. They are therefore positioned at one end of the magnetic elements 32.

In practice, these sensors CA, CB, CC are angularly offset, around the axis X, relative to the windings 29, for bulk reasons. These sensors CA, CB, CC in particular deliver information required to be able to generate control signals governing the operation of the electric motor 16, but also to determine the position of the rotor 13, in particular the number of revolutions performed, the end of travel position, the intermediate position, blocked position detection. It is possible to use a number of sensors CA, CB, CC equal to the number of phases of the stator 14, here three phases, or a number of sensors CA, CB, CC smaller than the number of phases, and to reconstitute the information of the missing sensor(s) CA, CB, CC. As shown in FIG. 5, the sensors CA, CB, CC here are arranged at regular angular intervals of 60° or 120° around a rotation axis X of the rotor 13, preferably on the printed circuit board 38, which in turn is positioned orthogonally to the rotation axis X of the rotor 13, in particular a half-moon-shaped circuit.

Table 1 below illustrates the truth table corresponding to the signals delivered by three sensors CA, CB, CC arranged in a synchronous electric motor 16 with permanent magnets with a conventional three-phase stator 14, driven by a set of six transistors. These binary signals are phase-shifted relative to one another.

|  |  | Signals | | |
| --- | --- | --- | --- | --- |
|  |  | S1 | S2 | S3 |
| Moment | T1 | 0 | 0 | 1 |
|  | T2 | 0 | 1 | 1 |
|  | T3 | 0 | 1 | 0 |
|  | T4 | 1 | 1 | 0 |
|  | T5 | 1 | 0 | 0 |
|  | T6 | 1 | 0 | 1 |

Different types of ferrite magnets are known, namely:
On the one hand, isotropic magnets, in particular manufactured using a so-called dry method, by pressing. The obtained solids are next magnetized in the desired direction to form the magnets.
On the other hand, anisotropic magnets, manufactured using a so-called wet method, by injection in a mold under the effect of a magnetic field. The direction of the magnetic field during production determines the direction of magnetization of the magnets.

The major advantage of ferrite magnets, aside from their cost, is their lack of sensitivity to corrosion; it is therefore not necessary to have them undergo a surface treatment.

Preferably, the permanent magnets 32 are manufactured using the wet method.

The method for molding anisotropic ferrite magnets using the wet method provides magnets having an approximate volume and a crude surface state. As a result, to obtain magnets in their final form, these are machined again, i.e., precision-ground, once they are molded. This precision-grinding method is done on benches along which the magnets slide to be machined.

If the thickness of the magnets is too thin, they may break during the honing method. Thus, the radial thickness e32 of the magnets 32, as well as the thickness-to-width ratio e32/l32, affect the possibility of producing these magnets industrially.

Advantageously, during the manufacturing of an electric motor 16 of an electromechanical actuator 12, a rotor 13 having a shared rotor body 31 is assembled with either a first stator 14a or a second stator 14b depending on the diameter D3 provided for the electric motor 16 to be produced, this diameter D3 in turn depending on the inner diameter D1 of a winding tube 4 or the section of the rail in which the electric motor 16 is intended to be installed.

Using a shared rotor body 31 for a line of electromechanical actuators 12, able to be made with different outer diameters and comprising electric motors 16a and 16b provided with different stators 14a, 14b and delivering different torque values, makes it possible to reduce the development and industrialization costs of the electromechanical actuators 12, and further to extend a line of electromechanical actuators 12.

Using the same rotor body 31, or even the same rotor 13, for a line of electromechanical actuators 12 makes it possible to meet the needs of applications requiring electric motors with different diameters, able to deliver different torque values, in particular motor applications for blinds or shutters of different types, sizes and/or weights or intended for different installations, for example inside or outside a building 100.

To make it possible to reuse a same rotor body 31 on electromechanical actuators comprising electric motors 16 with different diameters D3 and D3', with values D3 and D3' for example respectively equal to about 35 and 45 mm, the manufacturing constraint of the stator 14 is greater for the electric motors whose diameter D3 is the smallest. Indeed, the difference in diameter here is about 10 mm.

This constraint can be resolved on the one hand by a different geometry of the stator 14 of the electromechanical actuators 12 in the range: in the case of the first electromechanical actuator 12 whose electric motor with diameter D3' is the largest, the poles 28 are distributed toward the outside and the windings 29 are made by the outside of the stator 14a. A cylinder head is next attached on the outside of the stator 14a to complete it; in the case of the second electromechanical actuator 12 whose electric motor 16 has the smallest diameter D3, the poles 28 are distributed toward the inside of the stator 14b from the closed circular peripheral wall 30. This causes a constraint on the winding method.

According to an alternative embodiment, the poles of both of the stators 14a and 14b are distributed toward the inside from the closed circular peripheral wall 30. The first and second rotors 13 of the first and second electric motors 16 can comprise a through shaft, such that the first and second electric motors 16 are dual-outlet motors, each outlet being able to be coupled to a drive shaft for the winding and unwinding of cords of the screen.

In all cases, the stators 14a and 14b are preferably obtained by stacking sheets forming their complete circumference before placing windings, and not by an assembly of wound sectors each having one or several teeth.

Many changes can be made to the example embodiment previously described without going beyond the scope of the invention.

The features of the embodiments and alternatives considered above may be combined to generate new embodiments of the invention.

The invention claimed is:

1. An electromechanical actuator for controlling screens, comprising an electronically-switched brushless DC electric motor, a rotor and a stator of the electric motor being positioned coaxially around an axis of rotation, the rotor comprising a rotor body provided with magnetic elements distributed over the outer surface of the rotor, the magnetic elements of the rotor being surrounded by the stator, which in turn is formed by a stator core comprising a circular peripheral wall and pole elements supporting windings, the pole elements being distributed on the inside of the peripheral wall of the stator, the electromechanical actuator being wherein:
the ratio between the outer diameter of the stator and its inner diameter is less than 1.7 and
the ratio between the axial length of the stator and the outer diameter of the stator is greater than 1.5.

2. The electromechanical actuator according to claim 1, wherein the stator comprises a total of six pole elements, which makes it a stator with six poles.

3. The electromechanical actuator according to claim 1, wherein the outer diameter of the electric motor of the actuator is smaller than 40 mm.

4. The electromechanical actuator according to claim 3, wherein the outer diameter of the electric motor of the actuator is smaller than 36 mm.

5. The electromechanical actuator according to claim 1, wherein the magnetic elements are formed by ferrite permanent magnets, the maximum radial thickness of which is greater than 3 mm.

6. The electromechanical actuator according to claim 1, wherein the outer diameter of the rotor is at least equal to half the outer diameter of the stator.

7. The electromechanical actuator according to claim 6, wherein the outer diameter of the electric motor of the actuator is smaller than 40 mm and wherein the permanent magnets are made in the form of tiles and glued on the rotor body, which is cylindrical.

8. The electromechanical actuator according to claim 1, wherein the rotor comprises four or eight permanent magnets in the form of tiles distributed on the periphery of the rotor body, while the stator comprises six poles.

9. The electromechanical actuator according to claim 1, wherein the magnetic elements are anisotropic magnets formed by a wet pressing method.

10. The electromechanical actuator according to claim 9, wherein the magnetic elements are machined after molding.

11. The electromechanical actuator according to claim 1, wherein the stator core is formed by a stack of sheets, and the pole elements of the stator core comprise, at the end of a tooth protruding with respect to the peripheral wall of the stator, an enlargement, the width of which is variable along the rotation axis, over the length of the stack of sheets.

12. The electromechanical actuator according to claim 1, wherein the peripheral wall of the stator is circular, closed and obtained from a stack of sheets each forming a closed circumference.

13. The electromechanical actuator according to claim 1, wherein the power to weight ratio of the electromechanical actuator is less than 65 watts per kilogram.

14. The electromechanical actuator according to claim 1, wherein the actuator comprises flanges made from an insulating material on which the ends of the windings of the stator are connected.

15. The electromechanical actuator according to claim 1, wherein it comprises metal flanges assembled on either side of the stator body and supporting the rotor using bearings or ball bearings.

16. An automation installation for closing or providing sun protection that comprises a screen (2) able to be wound on a winding tube (4) rotated by an electromechanical actuator (12) according to claim 1.

17. The electromechanical actuator according to claim 1, wherein the ratio between the outer diameter of the stator and its inner diameter is less than 1.6.

18. The electromechanical actuator according to claim 17, wherein the ratio between the outer diameter of the stator and its inner diameter is less than 1.58.

19. The electromechanical actuator according to claim 1, wherein the ratio between the axial length of the stator and the outer diameter of the stator is greater than 2.

* * * * *